(12) United States Patent
Kalgaonkar et al.

(10) Patent No.: US 11,643,590 B1
(45) Date of Patent: *May 9, 2023

(54) METHODS AND COMPOSITIONS OF USING VISCOELASTIC SURFACTANTS AS DIVERSION AGENTS

(71) Applicants: SAUDI ARABIAN OIL COMPANY, Dhahran (SA); KING FAHD UNIVERSITY OF PETROLEUM & MINERALS, Dhahran (SA)

(72) Inventors: Rajendra Arunkumar Kalgaonkar, Dhahran (SA); Mohammed Abudullah Bataweel, Dhahran (SA); Eyad Alali, Dammam (SA); Nisar Ullah, Dhahran (SA); Muhammad Mansha, Dhahran (SA)

(73) Assignees: SAUDI ARABIAN OIL COMPANY, Dhahran (SA); KING FAHD UNIVERSITY OF PETROLEUM & MINERALS, Dhahran (SA)

(*) Notice: Subject to any disclaimer, the term of this patent is extended or adjusted under 35 U.S.C. 154(b) by 0 days.

This patent is subject to a terminal disclaimer.

(21) Appl. No.: 17/454,699

(22) Filed: Nov. 12, 2021

(51) Int. Cl.
*C09K 8/60* (2006.01)
*C09K 8/84* (2006.01)

(52) U.S. Cl.
CPC .............. *C09K 8/604* (2013.01); *C09K 8/845* (2013.01)

(58) Field of Classification Search
CPC .......... C09K 8/60; C09K 8/602; C09K 8/604; C09K 8/84; C09K 8/845; C09K 8/86
See application file for complete search history.

(56) References Cited

U.S. PATENT DOCUMENTS 6,302,209 B1  10/2001  Thompson, Sr. et al.
7,237,608 B2   7/2007  Fu et al.
(Continued)

FOREIGN PATENT DOCUMENTS

CN    112812076 A  *  5/2021  .......... C07D 295/13
EP    0 439 186 A2 *  1/1991  .......... C07C 309/14
EP    3 071 665 A2     9/2016

OTHER PUBLICATIONS

Zhang, et al., Development of a Stimuli-Responsive Gemini Zwitterionic Viscoelastic Surfactant for Self-Diverting Acid, Feb. 2019, 22, 535-547 (Year: 2019).*

(Continued)

*Primary Examiner* — Angela M DiTrani Leff
(74) *Attorney, Agent, or Firm* — Osha Bergman Watanabe & Burton LLP

(57) ABSTRACT

A wellbore fluid including a first surfactant, a second surfactant, an activator and an aqueous base fluid is provided. The first surfactant has a structure represented by Formula (I):

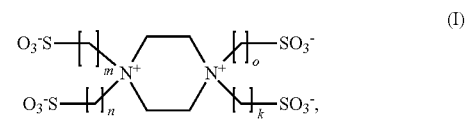

where m is an integer ranging from 2 to 3, and n, o, and k are each, independently, integers ranging from 2 to 10. The second surfactant has a structure represented by Formula (III):

(Continued)

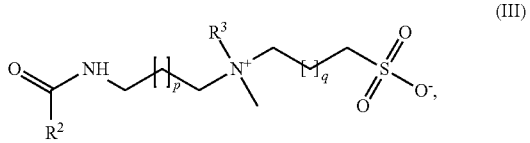

(III)

where $R^2$ is a $C_{15}$-$C_{27}$ hydrocarbon group or a $C_{15}$-$C_{29}$ substituted hydrocarbon group, $R^3$ is a $C_1$-$C_{10}$ hydrocarbon group, and p and q are each, independently, an integer ranging from 1 to 4. A method for treating a hydrocarbon-containing formation with the wellbore fluid is also provided.

19 Claims, 3 Drawing Sheets

(56) References Cited

U.S. PATENT DOCUMENTS

| | | | |
|---|---|---|---|
| 7,621,334 | B2 | 11/2009 | Welton et al. |
| 8,183,181 | B1 | 5/2012 | Gupta et al. |
| 9,650,558 | B2 | 5/2017 | Gupta et al. |
| 10,479,762 | B1 | 11/2019 | Hussain et al. |
| 11,203,712 | B1 | 12/2021 | Kalgaonkar et al. |
| 2004/0214725 | A1 | 10/2004 | Moss |
| 2005/0233911 | A1 | 10/2005 | Samuel |
| 2005/0252658 | A1 | 11/2005 | Willingham et al. |
| 2006/0105919 | A1 | 5/2006 | Colaco et al. |
| 2007/0167332 | A1 | 7/2007 | Subramanian et al. |
| 2009/0065204 | A1 | 3/2009 | Dahanayake et al. |
| 2009/0275490 | A1 | 11/2009 | Milne et al. |
| 2010/0056402 | A1 | 3/2010 | Li et al. |
| 2010/0122815 | A1 | 5/2010 | Zamora et al. |
| 2010/0197530 | A1* | 8/2010 | Gupta .................. C09K 8/68 507/236 |
| 2011/0092398 | A1 | 4/2011 | Dahanayake et al. |
| 2011/0152135 | A1 | 6/2011 | Chen et al. |
| 2012/0085534 | A1 | 4/2012 | Morvan et al. |
| 2015/0072905 | A1 | 3/2015 | Hartshorne et al. |
| 2016/0257873 | A1 | 9/2016 | Cadix |
| 2017/0327733 | A1* | 11/2017 | Li .......................... C09K 8/68 |
| 2020/0263077 | A1 | 8/2020 | Hussain et al. |
| 2021/0380867 | A1 | 12/2021 | Kalgaonkar et al. |
| 2021/0380871 | A1* | 12/2021 | Kalgaonkar ............ C09K 8/68 |

OTHER PUBLICATIONS

Arian, Fatemeh et al., "Novel Sultone Based Bronsted Acidic Ionic Liquids with Perchlorate Counter-Anion for One-pot Synthesis of 2H-indazolo[2,1-b]phthalazine-triones"; Journal of Molecular Structure; vol. 1229, Article 129599; pp. 1-23; Apr. 5, 2021 (24 pages).

Chu, Zonglin et al., "A Facile Route towards the Preparation of Ultra-Long-Chain Amidosulfobetaine Surfactants"; Synlett; vol. 2009, Issue 16; pp. 2655-2658; Sep. 9, 2009 (4 pages).

Chu, Zonglin et al., "Empirical Correlations between Krafft Temperature and Tail Length for Amidosulfobetaine Surfactants in the Presence of Inorganic Salt"; Langmuir; vol. 28, Issue 2; pp. 1175-1181; Dec. 7, 2011 (7 pages).

Hussain, S.M. Shakil et al., "Effect of internal olefin on the properties of betaine-type zwitterionic surfactants for enhanced oil recovery"; Journal of Molecular Liquids; vol. 266; pp. 43-50; Sep. 15, 2018 (8 pages).

Kamal, Muhammad Shahzad et al., "A Zwitterionic Surfactant Bearing Unsaturated Tail for Enhanced Oil Recovery in High-Temperature High-Salinity Reservoirs"; Journal of Surfactants and Detergents; vol. 21, Issue 1; pp. 165-174; Feb. 21, 2018 (10 pages).

Köberle, P. et al., "Hydeophobically Modified Zwitterionic Polymers: Synthesis, Bulk Properties, and Miscibility with Inorganic Salts"; Macromolecules; vol. 27, Issue 8; pp. 2165-2173; Apr. 1, 1994 (9 pages).

Li, Ping et al., "Membrane Surface Engineering with Bifunctional Zwitterions for Efficient Oil-Water Separation"; ACS Applied Materials & Interfaces; vol. 11, Issue 34; pp. 31328-31337; Aug. 28, 2019 (10 pages).

Mansha, Muhammad et al., "Synthesis, Characterization, and Viscosification of Amidosulfobutaine and Zwitterionic Gemini Surfactants"; Journal of Surfactants and Detergents; vol. 24, Issue 4; pp. 697-706; Nov. 20, 2020 (10 pages).

Zhao, Liqiang et al., "A review of diverting agents for reservoir stimulation"; Journal of Petroleum Science and Engineering; vol. 187, Article 106734; pp. 1-18; Apr. 2020 (21 pages).

* cited by examiner

METHODS AND COMPOSITIONS OF USING VISCOELASTIC SURFACTANTS AS DIVERSION AGENTS

BACKGROUND

Well stimulation enables the improved extraction of hydrocarbon reserves that conventional recovery processes, such as gas or water displacement, cannot access. One well stimulation technique is matrix stimulation, which may also be referred to as matrix acidizing treatment. In matrix stimulation, an acidic fluid is injected into a formation at a pressure below the fracture pressure and is used to stimulate a reservoir by reacting with the reservoir rock, thereby dissolving the rock to create a pathway for hydrocarbon production.

However, when the acidic fluid has a low viscosity, the acid may have limited penetration into the formation and only react at the face of the rock. This is not an effective method for stimulating the reservoir as a conductive pathway for hydrocarbon production is not created. Further, most of the reservoirs have heterogeneous permeabilities which result in the low viscosity acid primarily penetrating the high permeable zones in the reservoir and leaving most of the low permeability zones untreated.

SUMMARY

This summary is provided to introduce a selection of concepts that are further described in the detailed description. This summary is not intended to identify key or essential features of the claimed subject matter, nor is it intended to be used as an aid in limiting the scope of the claimed subject matter.

In one aspect, embodiments of the present disclosure relate to a wellbore fluid comprising a first surfactant, a second surfactant, an activator and an aqueous base fluid. The first surfactant has a structure represented by Formula (I):

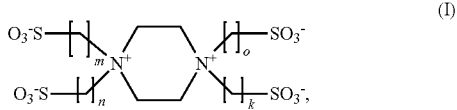

where m is an integer ranging from 2 to 3, and n, o, and k are each, independently, integers ranging from 2 to 10. The second surfactant has a structure represented by Formula (III):

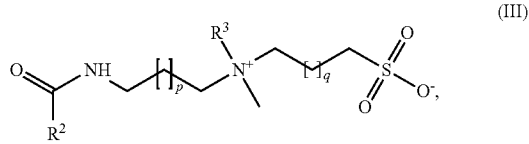

where $R^2$ is a $C_{15}$-$C_{27}$ hydrocarbon group or a $C_{15}$-$C_{29}$ substituted hydrocarbon group, $R^3$ is a $C_1$-$C_{10}$ hydrocarbon group, and p and q are each, independently, an integer ranging from 1 to 4.

In another aspect, embodiments disclosed herein relate to a method for treating a hydrocarbon-containing formation comprising injecting a wellbore fluid into a high permeability zone of a hydrocarbon-containing formation, where the high permeability zone increases the temperature of the wellbore fluid, resulting in the wellbore fluid having an increased viscosity. The wellbore fluid comprises a first surfactant, a second surfactant, an activator and an aqueous base fluid. The first surfactant has a structure represented by Formula (I):

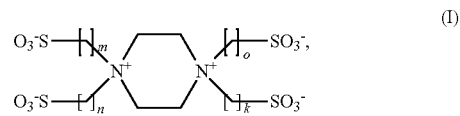

where m is an integer ranging from 2 to 3, and n, o, and k are each, independently, integers ranging from 2 to 10. The second surfactant has a structure represented by Formula (III):

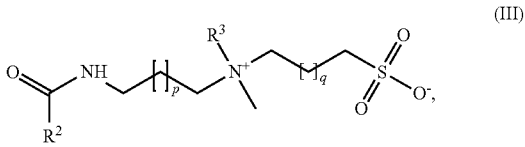

where $R^2$ is a $C_{15}$-$C_{27}$ hydrocarbon group or a $C_{15}$-$C_{29}$ substituted hydrocarbon group, $R^3$ is a $C_1$-$C_{10}$ hydrocarbon group, and p and q are each, independently, an integer ranging from 1 to 4.

Other aspects and advantages of the claimed subject matter will be apparent from the following description and the appended claims.

DETAILED DESCRIPTION

Figure 1:
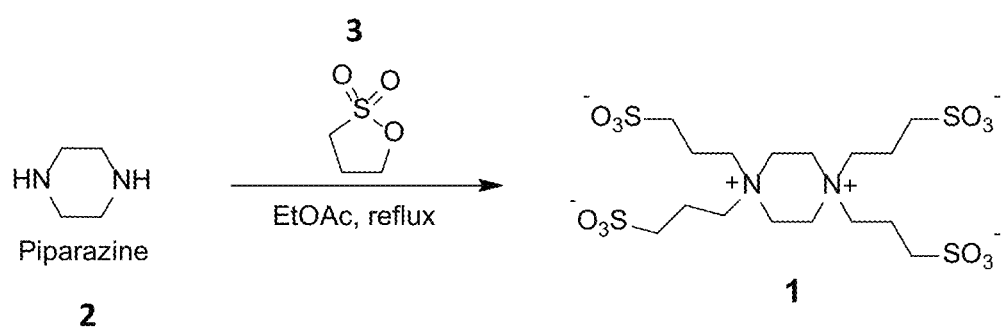
FIG. 1 is a reaction scheme for preparing a surfactant in accordance with one or more embodiments.

Embodiments in accordance with the present disclosure generally relate to a surfactant mixture, wellbore fluids that contain surfactant mixtures and an activator, and methods of using the fluids in processes such as acid stimulation and enhanced oil recovery (EOR). The surfactants may be viscoelastic. Methods of one or more embodiments may involve injecting the wellbore fluids into a formation, exposing the fluid to an increased temperature and resulting in the wellbore fluid having an increased viscosity. Such methods may modify the injection profile of the formation a well stimulation treatment by diverting stimulation fluid to lower permeability zones of the reservoir.

The wellbore fluids may be low-viscosity aqueous solutions that increase in viscosity under downhole conditions. The wellbore fluids may demonstrate increased stability under high temperature and pressure conditions, making them highly suitable for use in downhole environments. When the wellbore fluid contacts a produced hydrocarbon its viscosity may drastically reduce, enabling easy flowback of the fluid post treatment. As the viscosifying material used in the present disclosure does not contain any solid particulates, it will be potentially non-damaging to the formation due to effective flowback and no residual deposition inside the formation.

One or more embodiments of the present disclosure relate to a wellbore fluid comprising a first surfactant, a second surfactant, an activator and an aqueous base fluid. The first surfactant may be a piperazine-based surfactant having a structure represented by Formula (I):

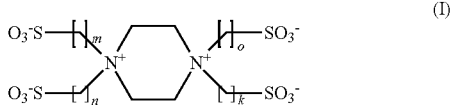

where m is an integer ranging from 2 to 3, and n, o, and k are each, independently, integers ranging from 2 to 10.

In one or more embodiments, the first surfactant may be a piperazine based surfactant such as 3,3',3'',3'''-(piperazine-1,4-diium-1,1,4,4-tetrayl)tetrakis(propane-1-sulfonate) having a structure represented by formula (II):

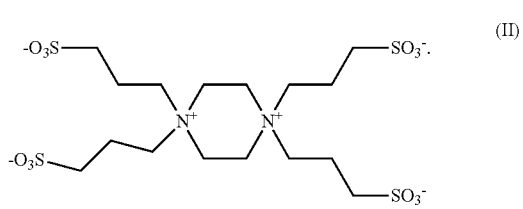

In one or more embodiments, the first surfactant may be thermally stable at a temperature of 200° C. or more, 250° C. or more, 300° C. or more, or 350° C. or more, as measured by thermogravimetric analysis (TGA).

In one or more embodiments, the first surfactant may be highly soluble in aqueous solutions, such as in deionized water, seawater, brines, calcium chloride solutions, and the like. In some embodiments, the first surfactant may be soluble in aqueous solutions in an amount of 10% by weight (wt. %) or more, 20 wt. % or more, 30 wt. % or more, or 40 wt. % or more at ambient temperature. In some embodiments, the solubility of the first surfactant may increase with increasing temperature, until gelation occurs.

One or more embodiments of the present disclosure are directed to wellbore fluids. The wellbore fluids of one or more embodiments may include, for example, water-based wellbore fluids. The wellbore fluids may be acid stimulation fluids or EOR fluids or among others.

In one or more embodiments, the water-based wellbore fluids may comprise an aqueous fluid. The aqueous fluid may include at least one of fresh water, seawater, brine, water-soluble organic compounds, and mixtures thereof. The aqueous fluid may contain fresh water formulated to contain various salts in addition to the first or second salt, to the extent that such salts do not impede the desired nitrogen-generating reaction. The salts may include, but are not limited to, alkali metal halides and hydroxides. In one or more embodiments, brine may be any of seawater, aqueous solutions wherein the salt concentration is less than that of seawater, or aqueous solutions wherein the salt concentration is greater than that of seawater. Salts that are found in seawater may include sodium, calcium, aluminum, magnesium, potassium, strontium, and lithium salts of halides, carbonates, chlorates, bromates, nitrates, oxides, phosphates, among others. Any of the aforementioned salts may be included in brine. In one or more embodiments, the density of the aqueous fluid may be controlled by increasing the salt concentration in the brine, though the maximum concentration is determined by the solubility of the salt. In particular embodiments, brine may include an alkali metal halide or carboxylate salt and/or alkaline earth metal carboxylate salts.

The wellbore fluids of one or more embodiments may comprise the first surfactant in an amount of the range of about 1 to 15% by weight (wt. %). For example, the wellbore fluid may contain the first surfactant in an amount ranging from a lower limit of any of 1, 1.5, 2, 2.5, 3, 4, 5, 7, 10, and 12 wt. % to an upper limit of any of 1.5, 2, 3, 4, 5, 6, 8, 10, 12, 14, and 15 wt. %, where any lower limit can be used in combination with any mathematically-compatible upper limit.

As described previously, the wellbore fluid may also include a second surfactant. The second surfactant may be a zwitterionic surfactant having a structure represented by Formula (III):

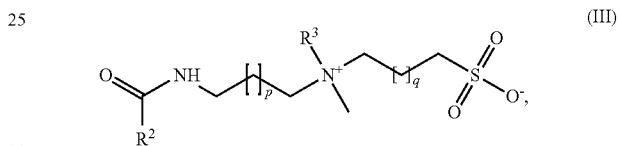

where $R^2$ is a $C_{15}$-$C_{27}$ hydrocarbon group or a $C_{15}$-$C_{29}$ substituted hydrocarbon group, $R^3$ is a $C_1$-$C_{10}$ hydrocarbon group, and p and q are each, independently, an integer ranging from 1 to 4.

In reference to $R^2$ and $R^3$, the term "hydrocarbon group" has the same meaning as discussed above with regard to $R^1$. As used with regard to $R^2$, the term "substituted hydrocarbon group" refers to a hydrocarbon group (as defined above) where at least one hydrogen atom is substituted with a non-hydrogen group that results in a stable compound. Such substituents may be groups selected from, but not limited to, halo, hydroxyl, alkoxy, oxo, alkanoyl, aryloxy, alkanoyloxy, amino, alkylamino, arylamino, arylalkylamino, disubstituted amines, alkanylamino, aroylamino, aralkanoylamino, substituted alkanoylamino, substituted arylamino, substituted aralkanoylamino, thiol, alkylthio, arylthio, arylalkylthio, alkylthiono, arylthiono, aryalkylthiono, alkylsulfonyl, arylsulfonyl, arylalkylsulfonyl, sulfonamide, substituted sulfonamide, nitro, cyano, carboxy, carbamyl, alkoxycarbonyl, aryl, substituted aryl, guanidine, and heterocyclyl, and mixtures thereof. In some embodiments, the substituted hydrocarbon group may comprise one or more alkylene oxide units. The alkylene oxide may be ethylene oxide.

In one or more particular embodiments, the second surfactant may be a zwitterionic surfactant have a structure represented by formula (IV):

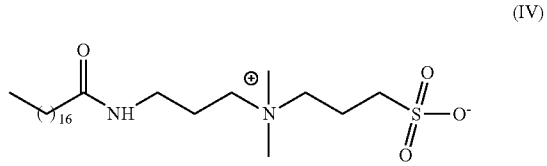

In one or more embodiments, the zwitterionic surfactant may be soluble in aqueous solutions, such as in deionized water, seawater, brines, calcium chloride solutions, and the like. In some embodiments, the zwitterionic surfactant may be soluble in aqueous solutions in an amount of 10% by weight (wt. %) or more, 20 wt. % or more, or 30 wt. % or more at ambient temperature. In some embodiments, the zwitterionic surfactant may have a lower aqueous solubility than the piperazine based surfactant. In some embodiments, the solubility of the zwitterionic surfactant may increase with increasing temperature, until gelation occurs.

The wellbore fluids of one or more embodiments may comprise the second surfactant in an amount of the range of about 1 to 15% by weight (wt. %). For example, the wellbore fluid may contain the second surfactant in an amount ranging from a lower limit of any of 1, 1.5, 2, 2.5, 3, 4, 5, 7, 10, and 12 wt. % to an upper limit of any of 1.5, 2, 3, 4, 5, 6, 8, 10, 12, 14, and 15 wt. %, where any lower limit can be used in combination with any mathematically-compatible upper limit.

In one or more embodiments, the wellbore fluid may comprise the first surfactant and the second surfactant in a weight ratio of 1:5 to 5:1 by weight, where the weight ratio is given as the weight of the first surfactant to the weight of the second surfactant. For example, the wellbore fluid may contain the first surfactant and the second surfactant in a weight ratio ranging from a lower limit of any of 1:5, 1:4, 1:3, 1:2, 1:1, and 2:1, to an upper limit of any of 1:2, 1:1, 2:1, 3:1, 4:1, and 5:1, where any lower limit can be used in combination with any mathematically-compatible upper limit.

The wellbore fluids of one or more embodiments may have a total surfactant content, including both the first and second surfactant, in an amount of the range of about 2 to 30% by weight (wt. %). For example, the wellbore fluid may have a total surfactant content in an amount ranging from a lower limit of any of 2, 2.5, 3, 4, 5, 7, 10, 12, 15, 20, and 25 wt. % to an upper limit of any of 1.5, 2, 3, 4, 5, 6, 8, 10, 12, 15, 20, 25, and 30 wt. %, where any lower limit can be used in combination with any mathematically-compatible upper limit.

The wellbore fluids may include an activator. The activator is an additive that, upon an increase in temperature, enables the surfactant to exhibit viscoelastic behavior and cause the wellbore fluid to increase in viscosity. Without being bound by any theory, the activators disclosed herein may enable the surfactant micelles to form a rod-shaped structure that entangle as the temperature of the fluid increases. This entanglement is the cause of the viscoelastic behavior and the increase in viscosity.

In one or more embodiments, the activator may be a salt. The salt may, for instance comprise a monovalent cation, such as an alkali metal or a Group 11 transition metal, or a divalent cation, such as an alkaline earth metal or a transition metal. In some embodiments, the salt may comprise a cation selected from the group consisting of lithium, sodium, potassium, magnesium, calcium, nickel, iron, tin, aluminum, and zinc. In some embodiments, the salt may comprise an anion selected from the group consisting of fluoride, chloride, bromide, carbonate, bicarbonate, sulfate, nitrate, nitrite, chromate, sulfite, oxalate, phosphate, and phosphite. In particular embodiments, the activator may be an alkaline earth metal halide, such as calcium chloride.

The wellbore fluids of one or more embodiments may comprise the activator in an amount of the range of about 5 to 30% by weight (wt. %). For example, the wellbore fluid may contain the activator in an amount ranging from a lower limit of any of 5, 6, 7, 8, 10, 12, 15, 17, 20, and 22 wt. % to an upper limit of any of 10, 12, 15, 17, 20, 22, 25, 27, and 30 wt. %, where any lower limit can be used in combination with any mathematically-compatible upper limit.

In one or more embodiments, the wellbore fluid may comprise the activator and the surfactants in a weight ratio of 30:1 to 1:3, by weight, where the weight ratio is given as the weight of the activator to the total weight of the surfactants. For example, the wellbore fluid may contain the activator and the surfactants in a weight ratio ranging from a lower limit of any of 1:3, 1:2, 1:1, 2:1, 4:1, 6:1, 8:1, 10:1 and 12:1 to an upper limit of any of 1:1, 2:1, 4:1, 6:1, 8:1, 10:1, 12:1, 15:1, 20:1, 25:1, and 30:1, where any lower limit can be used in combination with any mathematically-compatible upper limit.

The wellbore fluids of one or more embodiments may include one or more acids. Acids may be particularly included when the wellbore fluid is to be used in a matrix stimulation process, as described below. The acid may be any suitable acid known to a person of ordinary skill in the art, and its selection may be determined by the intended application of the fluid. In some embodiments, the acid may be one or more selected from the group consisting of hydrochloric acid, sulfuric acid, carboxylic acids such as acetic acid, and hydrofluoric acid. In some embodiments, the hydrofluoric acid may be included as a hydrogen fluoride source, such as ammonium fluoride, ammonium bifluoride, fluoroboric acid, hexafluorophosphoric acid, and the like.

The wellbore fluid of one or more embodiments may comprise the one or more acids in a total amount of the range of about 0.01 to 30.0 wt. %. For example, the wellbore fluid may contain the acids in an amount ranging from a lower limit of any of 0.01, 0.05, 0.1, 0.5, 1.0, 5.0, 10, 15, 20, and 25 wt. % to an upper limit of any of 0.5, 1.0, 5.0, 10, 15, 20, 25, and 30 wt. %, where any lower limit can be used in combination with any mathematically-compatible upper limit.

The wellbore fluids of one or more embodiments may include one or more additives. The additives may be any conventionally known and one of ordinary skill in the art will, with the benefit of this disclosure, appreciate that the selection of said additives will be dependent upon the intended application of the wellbore fluid. For instance, if the wellbore fluid is to be used as a fracturing fluid, it may comprise a proppant such as sand. In some embodiments, the additives may be one or more selected from clay stabilizers, scale inhibitors, corrosion inhibitors, biocides, friction reducers, thickeners, and the like.

The wellbore fluid of one or more embodiments may comprise the one or more additives in a total amount of the range of about 0.01 to 30.0 wt. %. For example, the wellbore fluid may contain the additives in an amount ranging from a lower limit of any of 0.01, 0.05, 0.1, 0.5, 1.0, 2.5, 5.0, 1.5, 10.0 and 12.5 wt. % to an upper limit of any of 0.1, 0.5, 1.0, 2.5, 5.0, 7.5, 10.0, 12.5, 15.0, 20.0 and 30.0 wt. %, where any lower limit can be used in combination with any mathematically-compatible upper limit.

In one or more embodiments, the wellbore fluid may contain little to no solid material. For example, the wellbore fluids of some embodiments may contain solid material in an amount of 2 wt. % or less, 1 wt. % or less, 0.5 wt. % or less, 0.1 wt. % or less, 0.05 wt. % or less, 0.01 wt. % or less, or 0.001 wt. % or less.

In one or more embodiments, the wellbore fluid may have a density that is greater than 0.90 g/cm$^3$. For example, the wellbore fluid may have a density that is of an amount ranging from a lower limit of any of 0.90, 0.95, 1.00, 1.05, 1.10, 1.15, and 1.20 g/cm³ to an upper limit of any of 1.00, 1.05, 1.10, 1.15, 1.20, and 1.25 g/cm³, where any lower limit can be used in combination with any mathematically-compatible upper limit.

In one or more embodiments, the wellbore fluid may have a viscosity at 40° C. that is of the range of about 1 to 30 cP. For example, the wellbore fluid may have a viscosity at 40° C. that is of an amount ranging from a lower limit of any of 1, 2, 3, 4, 5, 6, 7, 8, 10, 12, and 15 cP to an upper limit of any of 4, 5, 6, 8, 10, 12, 14, 16, 18, 20, 22, 25, 27, and 30 cP, where any lower limit can be used in combination with any mathematically-compatible upper limit. In some embodiments, the wellbore fluids may have a viscosity at 40° C. of 30 cP or less, 25 cP or less, 20 cP or less, 15 cP or less, or 10 cP or less.

In one or more embodiments, the wellbore fluid may have a viscosity at 90° C. that is of the range of about 150 to 400 cP. For example, the wellbore fluid may have a viscosity at 90° C. that is of an amount ranging from a lower limit of any of 150, 175, 200, 225, and 250 cP to an upper limit of any of 275, 300, 325, 350, 375, and 400 cP, where any lower limit can be used in combination with any mathematically-compatible upper limit. In some embodiments, the wellbore fluids may have a viscosity at 90° C. of 150 cP or more, 200 cP or more, 250 cP or more, or 300 cP or more, or 350 cP or more.

The wellbore fluid of one or more embodiments may have a viscosity that is higher at 90° C. than at 40° C. In one or more embodiments, the wellbore fluid may have a ratio of a viscosity at 90° C. to a viscosity at 40° C. that is of the range of about 5:1 to 400:1. For example, the wellbore fluids may have a ratio of a viscosity at 90° C. to a viscosity at 40° C. that is of the range having a lower limit of any of 5:1, 10:1, 20:1, 30:1, 50:1, and 100:1, to an upper limit of any of 125:1, 150:1, 200:1, 250:1, 300:1, 350:1 and 400:1, where any lower limit can be used in combination with any mathematically-compatible upper limit.

In one or more embodiments, the viscosity of the wellbore fluid may decrease after contacting with a hydrocarbon. For example, after contacting with a hydrocarbon such as diesel, the wellbore fluid may have a viscosity at 90° C. that is of an amount ranging from 5 to 200 cP. In one or more embodiments, after contacting with a hydrocarbon such as diesel, the wellbore fluid may have a viscosity at 90° C. that is of an amount ranging from a lower limit of any of 5, 6, 7, 8, 9, 10, 15, 20, 30, and 50 cP to an upper limit of any of 75, 100, 125, 150, 175 and 200 cP, where any lower limit can be used in combination with any mathematically-compatible upper limit. In some embodiments, after contacting with a hydrocarbon such as diesel, the wellbore fluid may have a viscosity at 90° C. of 200 cP or less, 100 cP or less, 50 cP or less, 20 cP or less, or 10 cP or less, or 8 cP or less.

In one or more embodiments, the wellbore fluid may have a pH that is neutral or acidic. For example, the wellbore fluid may have a pH ranging from a lower limit of any of 2, 3, 4, 4.5, 5, 5.5, and 6, to an upper limit of any of 3, 4, 4.5, 5, 5.5, 6, 6.5, and 7, where any lower limit can be used in combination with any mathematically-compatible upper limit. In some embodiments, the wellbore fluid may have a pH of 7 or less, of 6 or less, of 5 or less, of 4 or less, or of 3 or less.

One or more embodiments of the present disclosure are directed to a synthesis of the surfactant represented by the aforementioned formula (I). As shown in FIG. 1, piperazine may be refluxed in ethyl acetate in the presence of 1,3-propane sultone to produce the surfactant represented for formula (I). The reaction may be carried out at a temperature near the boiling point of ethyl acetate, such as at about 77 to 78° C. In one or more embodiments, an excess of the sultone is used. A molar ratio of the piperazine to 1,3-butane sultone may be in a range of from 1:5 to 1:12 or, 1:7 to 1:10. The reaction mixture may be refluxed for about 6 to 24 hours. A white precipitate is formed that may then be filtered and washed with ethyl acetate, diethyl ether and acetone. The reaction yield was 95%.

Methods in accordance with the present disclosure may comprise the injection of a wellbore fluid into a formation. In one or more embodiments, the wellbore fluid may be a single treatment fluid that is injected into the wellbore in one pumping stage. In other embodiments, methods in accordance with one or more embodiments may involve the injection of the wellbore fluid and one or more additional stimulation fluids. The additional stimulation fluids may, in some embodiments, be co-injected with the wellbore fluid. In some embodiments, the stimulation fluids may be injected after the wellbore fluid.

The wellbore fluid of one or more embodiments has a low viscosity at low temperatures and, therefore, good injectivity, while being thermally stable enough for use downhole. Upon exposure to increased temperatures in the wellbore, the wellbore fluid may increase in viscosity. This phenomenon has the effect of reducing fluid mobility, resulting in diverting the flow from high permeability zones to lower ones and, ultimately, providing improved oil recovery.

The methods of one or more embodiments of the present disclosure may further comprise a pre-flushing step before the injection of the wellbore fluid. The pre-flushing step may comprise flushing the formation with a flushing solution that comprises one or more surfactants. The flushing solution may be an aqueous solution, and the surfactant may be the same surfactants as included in the wellbore fluid. The pre-flushing may limit the adsorption of the surfactants on the rock surface of the formation during the injection process. The suitability of the use of a pre-flushing step may depend on the type of surfactant and rock.

The hydrocarbon-containing formation of one or more embodiments may be a formation containing multiple zones of varying permeability. For instance, the formation may contain at least a zone having a relatively higher permeability and a zone having a relatively lower permeability. During conventional injection, fluids preferentially sweep the higher permeability zone, leaving the lower permeability zone incompletely swept. In one or more embodiments, the increased viscosity of the wellbore fluid may "plug" the higher permeability zone, allowing subsequent fluid to sweep the low permeability zone and improving sweep efficiency.

In one or more embodiments, the formation may have a temperature ranging from about 120 to 350° C. For example, the formation may have a temperature that is of an amount ranging from a lower limit of any of 120, 140, 160, 180, and 200° C. to an upper limit of any of 200, 225, 250, 275, 300, 325, and 350° C., where any lower limit can be used in combination with any mathematically-compatible upper limit.

Figure 2:
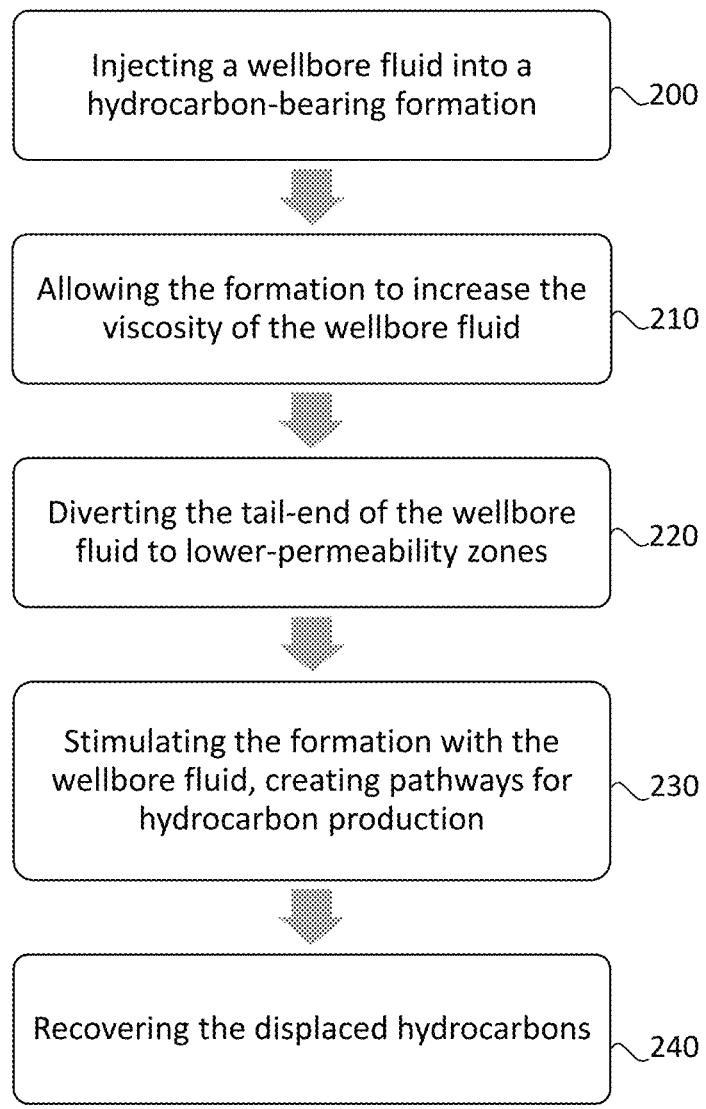
FIG. 2 is a block flow diagram of a method in accordance with one or more embodiments.

The methods of one or more embodiments may be used for well stimulation. A well stimulation process in accordance with one or more embodiments of the present disclosure is depicted by, and discussed with reference to, FIG. 2. Specifically, in step 200, the wellbore fluid may be injected into a hydrocarbon-bearing formation at an injection well. In some embodiments, the injection of the wellbore fluid may be performed at a pressure that is below the fracturing pressure of the formation. In step 210, a zone within the formation may be at a high temperature and increase the viscosity of the wellbore fluid. In step 220, after the increase in viscosity, the tail-end of the fluid is diverted to lower-permeability zones of the formation, displacing hydrocarbons. This results from the increase in viscosity that may "plug" the more permeable zones of the formation. In step 230, the formation is stimulated by the wellbore fluid, creating pathways for hydrocarbon production. In step 240, the displaced hydrocarbons may be recovered through the stimulated reservoir. In one or more embodiments, the hydrocarbons may be recovered at a production well.

The well stimulation process of one or more embodiments may be a matrix stimulation process. In the matrix stimulation process of one or more embodiments, the wellbore fluid, or one of the stimulation fluids, contains an acid. The acid fluid may react with the formation, dissolving rock, and creating wormholes that create a pathway for hydrocarbons to be displaced from deeper within the rock. In one or more embodiments, the wellbore fluid may increase in viscosity in the formation, enabling the fluid to better penetrate lower-permeability zones of the formation and allowing the acid to more uniformly react with the entire formation. This may provide for the formation of deeper wormholes and enhancing the overall permeability of the near-wellbore region. In the absence of this viscosity increase, the fluid will primarily penetrate the high permeability zones.

In one or more embodiments, the well stimulation process may be repeated one or more times to increase the amount of hydrocarbons recovered. In some embodiments, subsequent well stimulation processes may involve the use of different amounts of the surfactant and/or different surfactants than the first. The methods of one or more embodiments may advantageously provide improved sweep efficiency.

EXAMPLES

The following examples are merely illustrative and should not be interpreted as limiting the scope of the present disclosure.

Stearic acid (95%), 3-(dimethylamino)-1-propylamine (99%), NaF (ACS reagent grade, ≥99%), 1,3-propanesultone (≥99%), ethyl acetate (HPLC grade), diethyl ether (ACS reagent grade, ≥99.8%), piperazine (anhydrous ≥99%), and acetone (ACS reagent grade, ≥99.5%) were used as-received.

Figure 3:
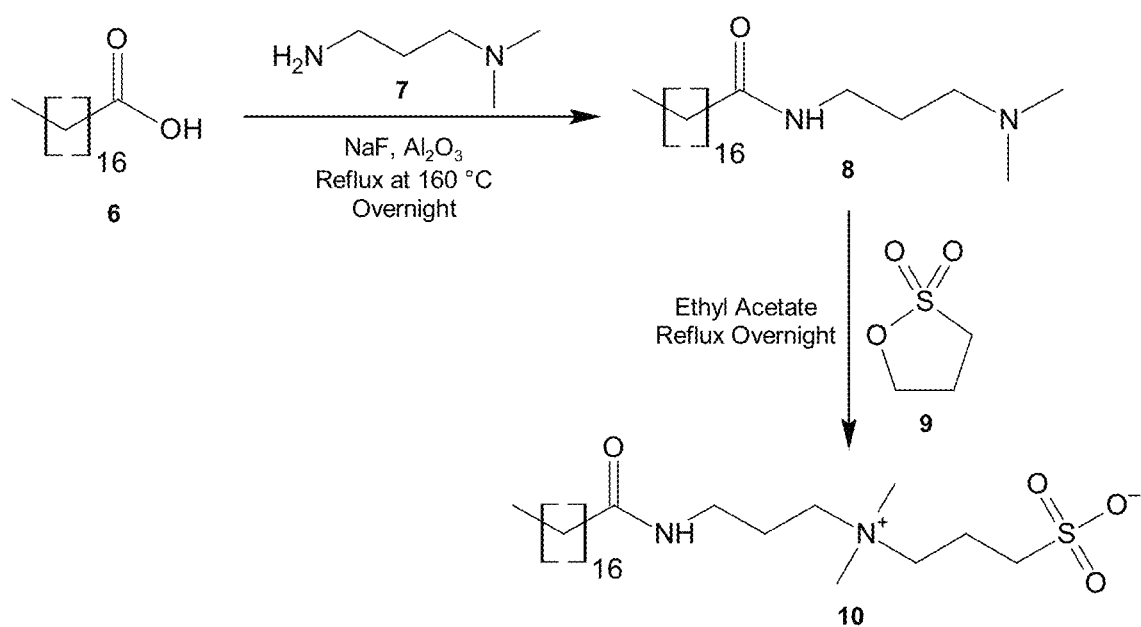
FIG. 3 is a reaction scheme for preparing a surfactant in accordance with one or more embodiments.

A zwitterionic surfactant 10 was prepared by the synthetic route illustrated in FIG. 3. Specifically, the zwitterionic surfactant 10 was synthesized by initially preparing the intermediate 8, and then then reacting 8 with 1,3-propanesultone 9.

Synthesis of
N-(3-(dimethylamino)propyl)nonadecanamide (8)

A two-necked round bottom flask, fixed with a reflux condenser and a bent tube, was charged with stearic acid 6 (5.00 g, 20.63 mmol), 3-(dimethylamino)-1-propylamine 7 (4.22 g, 41.25 mmol), and NaF (0.09 g, 2.06 mmol). The bent tube was filled with well dried alumina, which absorbs any water generated by the reaction. The flask was heated at a temperature of 160° C. for eight hours under a $N_2$ atmosphere. A second aliquot of 3-(dimethylamino)-1-propylamine 7 (30.94 mmol) was added and the conditions were maintained for a further six hours. After cooling to room temperature, the solid residue was collected, washed with cold acetone:water (93:7 mL), and dried under vacuum to yield a white solid 8. $^1$H-NMR [$CD_3OD$]=0.869 (t, 3H), 1.451-1.521 (m, 27H), 1.240-1.657 (m, 4H), 2.133 (t, 2H), 2.224 (s, 6H), 2.334 (t, 2H), 3.332 (t, 2H); $^{13}$C-NMR [$CD_3OD$]=18.95, 22.14, 25.22, 28.11, 33.32, 35.68, 35.88, 44.02, 50.66, 61.57, 63.46, 177.53, 180.53.

Synthesis of 3-(metheyliumyl(methyl)(3-stearamidopropyl)-14-azaneyl)propane-1-sulfonate (SDAS, 10)

A 250-mL two-necked flask fixed with a reflux condenser was charged with 8 (5.00 g, 15.31 mmol), 1,3-propanesultone 9 (2.81 g, 22.97 mmol), and ethyl acetate (100 mL). The flask was heated at 80° C. for 12 h. After cooling to room temperature, the solid was collected, washed successively using ethyl acetate (100 mL) and diethyl ether (50 mL), and dried under vacuum to yield SDAS 10 as a white solid (6.14 g, 89% yield). $^1$H-NMR [$CDCl_3$]=1.101 (t, 3H), 1.451-1.521 (m, 27H), 1.805 (m, 2H), 2.185 (t, 2H), 2.324-2.425 (m, 4H), 3.075 (t, 2H), 3.473 (t, 2H), 3.54 (s, 6H), 3.726 (t, 2H); $^{13}$C-NMR [$CD_3OD$]=14.0, 19.3, 22.6, 23.0, 25.9, 29.3, 29.6, 29.7, 31.9, 36.3, 36.4, 48.1, 50.9, 62.6, 63.2, 174.6; FTIR ($cm^{-1}$)=3265.42, 2915.00, 2884.61, 1666.49, 1552.64, 1467.54, 1174.26, 1035.13, 723.06.

Synthesis of 3,3',3'',3'''-(piperazine-1,4-diium-1,1,4,4-tetrayl)tetrakis(propane-1-sulfonate)

A piperazine based surfactant was prepared according to the reaction scheme previously described and as shown in FIG. 1. 1.0 g (11.60 mmol) of piperazine 2 was loaded in a round bottom flask having 20 mL of ethyl acetate. Then, 1,3-propane sultone 3 (69.6 mmol) was added in the reaction flask. The oil bath was allowed to reach 99° C. and the reaction mixture was allowed to reflux for 12-14 hours. The white precipitates that formed were filtered and washed with ethyl acetate, diethyl ether and acetone. Typically, 15 g of solvent was used for each gram of product for the washing steps. The product was dried under vacuum. $^1$H-NMR [$D_2O$]=2.096 (m, 8H), 2.914 (t, 8H), 3.240 (t, 8H), 3.51 (t, 8H); $^{13}$C-NMR [$D_2O$]=20.23, 48.36, 49.82, 56.11. FTIR ($cm^{-1}$)=3007.99, 2978.34, 1447.37, 1239.18, 1215.18, 1143.90, 952.86, 787.80.

Viscosification Experiments

The zwitterionic surfactant 10 was mixed with the piperazine based surfactant 1 in a weight ratio of 1:1. Each surfactant mixture was then added to two different concentrations of $CaCl_2$ in distilled water. The $CaCl_2$ was used at amounts of of 10% and 20% by weight of the total amount of $CaCl_2$) and water. Thereafter, 5 wt. % of the total surfactant mixture (2.5 wt. % SDAS 10 and 2.5 wt. % of piperazine based surfactant 1) was added to 95 wt. % of the 10 or 20% $CaCl_2$ solutions. The viscosity of the surfactant solutions was measured at room temperature, 40° C. and at 90° C. under different shear rates. The results are provided in Table 1.

TABLE 1

Viscosity Results in $CaCl_2$ solutions

| Shear Rate | Viscosity of 10% $CaCl_2$ solution (cPs) | | | Viscosity of 20% $CaCl_2$ solution (cPs) | | |
|---|---|---|---|---|---|---|
| ($s^{-1}$) | RT | 40° C. | 90° C. | RT | 40° C. | 90° C. |
| 1.02 | 24.32 | 7.81 | 6047 | 15.23 | 15.76 | 2891 |
| 5.00 | 7.64 | 4.33 | 1374 | 10.33 | 7.91 | 733.4 |

TABLE 1-continued

Viscosity Results in CaCl₂ solutions

| Shear Rate | Viscosity of 10% CaCl₂ solution (cPs) | | | Viscosity of 20% CaCl₂ solution (cPs) | | |
|---|---|---|---|---|---|---|
| ($s^{-1}$) | RT | 40° C. | 90° C. | RT | 40° C. | 90° C. |
| 10.00 | 6.56 | 3.19 | 742.4 | 7.28 | 6.32 | 411.8 |
| 15.00 | 6.12 | 3.12 | 510.5 | 6.54 | 5.47 | 292.2 |
| 20.00 | 5.37 | 2.87 | 393.9 | 5.18 | 4.56 | 243.5 |
| 25.00 | 4.78 | 2.79 | 380.2 | 4.67 | 4.09 | 232.7 |
| 35.00 | 4.34 | 1.61 | 354.3 | 3.89 | 3.9 | 209.9 |

As shown, the viscosity of the surfactant solutions increases dramatically as the temperature increases.

Gel Breaking Experiments

The gel breaking properties of the piperazine based surfactant 1 mixed with zwitterionic surfactant 10 was studied by mixing the two surfactants with diesel. Different quantities of diesel were mixed with a 2 wt. % solution of 1:1 ratio of surfactant 1 and surfactant 10 in a 20% CaCl₂ solution as previously described. The viscosity was tested at 90° C. at different shear rates. The results are shown in Table 2.

TABLE 2

Viscosity Results of Diesel in Surfactant and CaCl₂ solutions

| | Viscosity (cPs) at 90° C. | | | | | | | |
|---|---|---|---|---|---|---|---|---|
| Shear Rate | 0% diesel | 1.37% diesel | 2.71% diesel | 5.27% diesel | 10.01% diesel | 14.31% diesel | 21.77% diesel | 28.02% diesel |
| 1.02 | 6047 | 5070 | 5727 | 5547 | 3133 | 109.4 | 179.7 | 171.9 |
| 5 | 1374 | 1307 | 1427 | 1510 | 926.3 | 63.78 | 98.85 | 94.07 |
| 10 | 742.4 | 768.9 | 779.4 | 800.3 | 489 | 48.26 | 70.78 | 73.19 |
| 15 | 510.5 | 520.72 | 516.62 | 526.92 | 323 | 43.03 | 56.31 | 63.75 |
| 20 | 393.9 | 400.12 | 407.55 | 413.56 | 232.7 | 41.84 | 49.81 | 55.78 |
| 25 | 380.2 | 385.67 | 395.23 | 399.41 | 178.8 | 39.53 | 44.31 | 51.64 |
| 35 | 354.3 | 370.34 | 379.81 | 365.93 | 129.6 | 34.61 | 39.24 | 46.9 |

As shown, the mixture of surfactants showed a significant decrease in the apparent viscosity with the addition of diesel.

The singular forms "a," "an," and "the" include plural referents, unless the context clearly dictates otherwise.

As used here and in the appended claims, the words "comprise," "has," and "include" and all grammatical variations thereof are each intended to have an open, non-limiting meaning that does not exclude additional elements or steps.

When the word "approximately" or "about" are used, this term may mean that there can be a variance in value of up to ±10%, of up to 5%, of up to 2%, of up to 1%, of up to 0.5%, of up to 0.1%, or up to 0.01%.

Ranges may be expressed as from about one particular value to about another particular value, inclusive. When such a range is expressed, it is to be understood that another embodiment is from the one particular value to the other particular value, along with all particular values and combinations thereof within the range.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

Although only a few example embodiments have been described in detail, those skilled in the art will readily appreciate that many modifications are possible in the example embodiments without materially departing from the scope of the disclosure. Accordingly, all such modifications are intended to be included within the scope of this disclosure as defined in the following claims. In the claims, means-plus-function clauses are intended to cover the structures described as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims, except for those in which the claim expressly uses the words 'means for' together with an associated function.

What is claimed:

1. A wellbore fluid, comprising:
   a first surfactant having a structure represented by Formula (I):

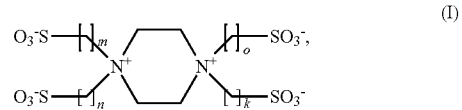

(I)

wherein m is an integer ranging from 2 to 3, and n, o, and k are each, independently, integers ranging from 2 to 10;
a second surfactant having a structure represented by Formula (III):

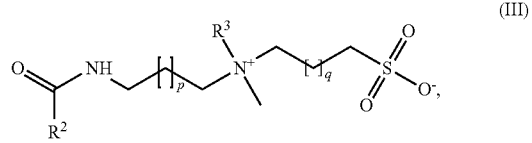

(III)

wherein $R^2$ is a $C_{15}$-$C_{27}$ hydrocarbon group or a $C_{15}$-$C_{29}$ substituted hydrocarbon group, $R^3$ is a $C_1$-$C_{10}$ hydrocarbon group, and p and q are each, independently, an integer ranging from 1 to 4;
an alkaline earth metal halide activator; and
an aqueous base fluid.

2. The wellbore fluid according to claim 1, wherein the first surfactant has a structure represented by formula (II):

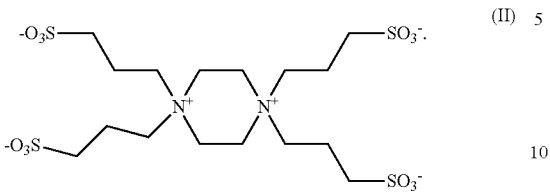

(II)

3. The wellbore fluid according to claim 1, wherein the second surfactant has a structure represented by formula (IV):

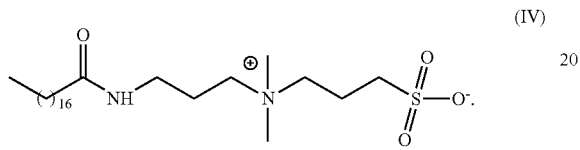

(IV)

4. The wellbore fluid according to claim 1, comprising 1 to 15 wt. % of the first surfactant.

5. The wellbore fluid according to claim 1, comprising 1 to 15 wt. % of the second surfactant.

6. The wellbore fluid according to claim 1, comprising 5 to 30 wt. % of the alkaline earth metal halide activator.

7. The wellbore fluid according to claim 1, further comprising an acid.

8. The wellbore fluid according to claim 1, wherein the alkaline earth metal halide activator is $CaCl_2$).

9. The wellbore fluid according to claim 1, wherein the wellbore fluid has a viscosity at 90° C. ranging from 150 to 400 cP.

10. A method for treating a hydrocarbon-containing formation, comprising:
 injecting a wellbore fluid into a high permeability zone of a hydrocarbon-containing formation, wherein the high permeability zone increases the temperature of the wellbore fluid, resulting in the wellbore fluid having an increased viscosity;
 wherein the wellbore fluid comprises:
  a first surfactant having a structure represented by Formula (I):

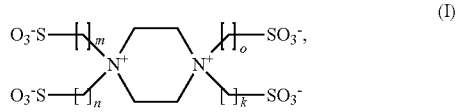

(I)

wherein m is an integer ranging from 2 to 3, and n, o, and k are each, independently, integers ranging from 2 to 10;

a second surfactant having a structure represented by Formula (III):

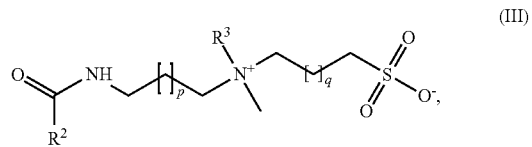

(III)

wherein $R^2$ is a $C_{15}$-$C_{27}$ hydrocarbon group or a $C_{15}$-$C_{29}$ substituted hydrocarbon group, $R^3$ is a $C_1$-$C_{10}$ hydrocarbon group, and p and q are each, independently, an integer ranging from 1 to 4;
an alkaline earth metal halide activator; and
an aqueous base fluid.

11. The method according to claim 10, wherein the first surfactant has a structure represented by formula (II):

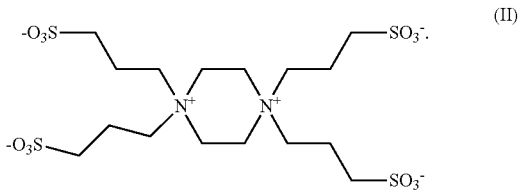

(II)

12. The method of claim 10, wherein the second surfactant has a structure represented by formula (IV):

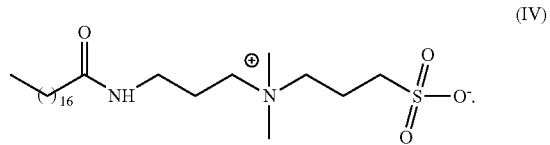

(IV)

13. The method according to claim 10, wherein the wellbore fluid comprises 1 to 15 wt. % of the first surfactant.

14. The method according to claim 10, wherein the wellbore fluid comprises 1 to 15 wt. % of the second surfactant.

15. The method according to claim 10, wherein the wellbore fluid comprises 5 to 30 wt. % of the alkaline earth metal halide activator.

16. The method according to claim 10, wherein the wellbore fluid further comprises an acid.

17. The method according to claim 10, wherein the alkaline earth metal halide activator is $CaCl_2$.

18. The method of claim 10, wherein the wellbore fluid has a viscosity at 90° C. ranging from 150 to 400 cP.

19. The method of claim 10, further comprising recovering the hydrocarbons from the hydrocarbon-containing formation.

* * * * *